United States Patent
Okazaki et al.

(10) Patent No.: US 7,163,979 B2
(45) Date of Patent: Jan. 16, 2007

(54) WATER BASED INTERCOAT COATING COMPOSITION AND MULTI-LAYER COATING FILM-FORMING METHOD BY USE OF THE SAME

(75) Inventors: Shuichi Okazaki, Kanagawa-ken (JP); Hideaki Katsuta, Kanagawa-ken (JP); Yutaka Mizutani, Kanagawa-ken (JP)

(73) Assignee: Kansai Paint Co. Ltd. (JP)

( * ) Notice: Subject to any disclaimer, the term of this patent is extended or adjusted under 35 U.S.C. 154(b) by 15 days.

(21) Appl. No.: 10/400,449

(22) Filed: Mar. 28, 2003

(65) Prior Publication Data

US 2003/0187125 A1   Oct. 2, 2003

(30) Foreign Application Priority Data

Mar. 29, 2002  (JP)  .............................. 2002-093664
Mar. 20, 2003  (JP)  .............................. 2003-077231

(51) Int. Cl.
C08J 3/00   (2006.01)
C08K 3/20   (2006.01)
C08L 75/00  (2006.01)
C08L 51/00  (2006.01)
B05D 3/02   (2006.01)

(52) U.S. Cl. ................ 524/539; 427/372.2; 427/385.5; 427/458; 427/470; 524/451; 524/500; 524/501; 524/591; 524/839; 524/840; 525/440

(58) Field of Classification Search ................ 524/539, 524/591, 839, 840, 451, 500, 501; 525/440; 427/372.2, 385.5, 458, 470
See application file for complete search history.

(56) References Cited

U.S. PATENT DOCUMENTS

| | | | |
|---|---|---|---|
| 6,080,296 A | | 6/2000 | Lieverz et al. |
| 6,099,968 A | * | 8/2000 | Harakawa et al. .......... 428/414 |
| 6,113,683 A | * | 9/2000 | Herren et al. ................ 106/494 |
| 2002/0013404 A1 | | 1/2002 | Buter et al. |

FOREIGN PATENT DOCUMENTS

| | | |
|---|---|---|
| JP | 9951/91 | 1/1991 |
| JP | 256075/99 | 9/1999 |

OTHER PUBLICATIONS

European Search Report from applicants corresponding European Patent Application.

* cited by examiner

*Primary Examiner*—Patrick D. Niland
(74) *Attorney, Agent, or Firm*—Fisher, Christen & Sabol

(57) ABSTRACT

A water based intercoat coating composition containing (A) a polyester resin comprising, as essential components, an alicyclic polybasic acid ($a_1$) and/or an alicyclic polyhydric alcohol ($a_2$), other polybasic acid ($a_3$) and other polyhydric alcohol ($a_4$), (B) a crosslinking agent, and (C) a water based urethane resin emulsion.

2 Claims, No Drawings

WATER BASED INTERCOAT COATING COMPOSITION AND MULTI-LAYER COATING FILM-FORMING METHOD BY USE OF THE SAME

This application has priority benefit of Japanese Patent Application Number 03/77231, filed on Mar. 20, 2003, that has priority benefit of Japanese Patent Application Number 02/93664, filed on Mar. 29, 2002.

BACKGROUND ART (1) Field of the Invention

The present invention relates to a water based intercoat coating composition showing excellent properties in a low solvent content or a low volatile organic compound content and in coating composition stability and capable of forming a coating film showing an excellent anti-chipping properties and to a multi-layer coating film-forming method by use of the water based intercoat coating composition.

(2) Description of Background Art

The automobile body is usually coated with a multi-layer coating film comprising an undercoat coating film with an electrodeposition coating composition, an intercoat coating film and a topcoat coating film for the purpose of imparting anti-corrosive properties and good appearance.

On the other hand, a coating composition using an organic solvent has mainly been used in the art. Since the use of the organic solvent may have possibility of danger of fire, influences on user's health, and recently influences particularly on environment, a coating composition using a safe and harmless solvent is demanded in the art.

In the field of the automobile coating, studies on a chemical treatment of substrate, a primer coating composition such as an electrodeposition coating composition, an intercoat coating composition and a topcoat coating composition for the purpose of preventing chipping and proceeding of corrosion due to the chipping have been made. Particularly, studies on the intercoat coating composition for the purpose of relaxing an impact force and preventing a peeling of a coating film from the surface of a metal, which is a cause of rust development have been made, resulting in demanding an intercoat coating composition having a function of the anti-chipping properties.

Recently, a tendency to thinning a film thickness and shortening a heat-curing time in the intercoat coating film from the standpoints of coating steps saving and energy saving demands an intercoat coating composition having an anti-chipping properties highly improved compared with the water based intercoat coating composition in the art.

Japanese Patent Application Laid-Open No. 256075/99 discloses an anti-chipping heat-curable powder coating composition prepared by adding a blocked polyisocyanate compound and a rubber particle and/or a crosslinked rubber particle comprising a rubbery polymer core layer and a vinyl polymer shell layer to a rubber-modified resin obtained by reacting a polyepoxide and a carboxyl group-containing rubber. Addition of the rubber particle and/or the crosslinked rubber particle showed poor properties in anti-chipping properties and coating composition stability under further severer conditions.

In addition to the intercoat coating composition capable of improving anti-chipping properties and making possible low VOC or reduction in volatile organic compound content, an intercoat coating composition capable of making possible good finished appearance and good coating composition stability is highly demanded.

SUMMARY OF THE INVENTION

It is an object of the present invention to provide a water based intercoat coating composition used in forming a multi-layer coating film showing excellent properties in anti-chipping properties, adhesion properties and water resistance, and a method of forming the multi-layer coating film.

It is another object of the present invention to provide a water based coating composition having a high solid content, low volatile organic compound content and excellent coating composition stability, and used for forming a multi-layer coating film showing excellent properties in anti-chipping properties and finished appearance.

The present inventors made intensive studies to find out that a water based intercoat coating composition containing (A) a polyester resin comprising, as essential components, an alicyclic polybasic acid ($a_1$), an alicyclic polyhydric alcohol ($a_2$), other polybasic acid ($a_3$) and other polyhydric alcohol ($a_4$), (B) a crosslinking agent, and (C) a water based urethane resin emulsion shows a high solid content, low volatile organic compound content and excellent coating composition stability, and a multi-layer coating film formed by use of the above water based intercoat coating composition shows excellent properties in anti-chipping properties, finished appearance and water resistance, resulting in accomplishing the present invention.

That is, the present invention firstly provides a water based intercoat coating composition containing (A) a polyester resin comprising, as essential components, an alicyclic polybasic acid ($a_1$) and/or an alicyclic polyhydric alcohol ($a_2$), other polybasic acid ($a_3$) and other polyhydric alcohol ($a_4$), (B) a crosslinking agent, and (C) a water based urethane resin emulsion.

The present invention secondly provides a multi-layer coating film-forming method which comprises successively coating a cationic electrodeposition coating composition onto a substrate, coating the above water based intercoat coating composition, curing or not curing, and coating a topcoating composition to form at least one topcoat coating film layer.

DETAILED DESCRIPTION OF THE INVENTION

The water based intercoat coating composition of the present invention and the multi-layer coating film-forming method of the present invention are explained more in detail hereinafter.

The water based intercoat coating composition of the present invention is obtained by dispersing the polyester resin (A) comprising, as essential components, the alicyclic polybasic acid ($a_1$), the alicyclic polyhydric alcohol ($a_2$), other polybasic acid ($a_3$) and other polyhydric alcohol ($a_4$), the blocked polyisocyanate curing agent (B) and the water-dispersible blocked polyisocyanate curing agent (C).

The polyester resin (A) is a polyester resin comprising, as essential components, the alicyclic polybasic acid ($a_1$), the alicyclic polyhydric alcohol ($a_2$), other polybasic acid ($a_3$) and other polyhydric alcohol ($a_4$), The alicyclic polybasic acid ($a_1$) is a compound having at least one alicyclic structure mainly of 4 to 6-membered rings, and at least two carboxyl groups in one molecule, and may include, for example, cyclohexane-1,3-dicarboxylic acid, cyclohexane-1,4-dicarboxylic acid, hexahydrophthalic acid, hexahydroisophthalic acid, hexahydroterephthalic acid, hexahydrotrimellitic acid, methylhexahydrophthalic acid, anhydrides thereof, and the like.

The other polybasic acid ($a_3$) is a compound having at least two carboxyl groups in one molecule, for example, may include phthalic acid, isophthalic acid, terephthalic acid, naphthalene dicarboxylic acid, 4,4-diphenyldicarboxylic acid, diphenylmethane-4,4'-dicarboxylic acid, succinic acid, adipic acid, azelaic acid, sebacic acid, chlorendic (HET) acid, maleic acid, fumaric acid, itaconic acid, trimellitic acid, pyromellitic acid, anhydrides thereof, and the like.

The alicyclic polyhydric alcohol ($a_2$) is a compound having at least one alicyclic structure mainly of 4 to 6-membered rings and at least two hydroxyl groups in one molecule, and may include, for example, 1,3-cyclohexanedimethanol, 1,4-cyclohexanedimethanol, tricyclodecanedimethanol, hydrogenated bisphenol A, hydrogenated bisphenol F, spiro-glycol, dihydroxymethyltricyclodecane, and the like.

Of the other polyhydric alcohol ($a_4$), the polyhydric alcohol having two hydroxyl groups in one molecule may include, for example, glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentyl glycol, hydroxypivalic acid, neopentyl glycol ester and the like; polylactonediol obtained by addition of lactones such as ε-caprolactone and the like to the above glycols, polyester diols such as bis(hydroxyethyl)terephthalate and the like.

Of the other polyhydric alcohol ($a_4$), the polyhydric alcohol having three hydroxyl groups in one molecule may include, for example, glycerin, trimethylolpropane, trimethylolethane, diglycerin, triglycerin, 1,2,6-hexanetriol, pentaerythritol, dipentaerythritol, sorbitol, mannitol, and the like.

A content of the alicyclic polybasic acid ($a_1$) and/or the alicyclic polyhydric alcohol ($a_2$) in the polyester resin (A) is in the range of 20 to 70% by weight, preferably 30 to 60% by weight based on a total solid content of monomers constituting the polyester resin (A).

A content less than 20% by weight of the alicyclic polybasic acid ($a_1$) and/or the alicyclic polyhydric alcohol ($a_2$) is ineffective on improvement in anti-chipping properties. A content more than 70% by weight may reduce weather resistance.

The polyester resin (A) obtained by reacting the alicyclic polybasic acid ($a_1$), other polybasic acid ($a_3$), the alicyclic polyhydric alcohol ($a_2$) and other polyhydric alcohol ($a_4$) has a weight average molecular weight in the range of 1,000 to 1000,000, preferably 2,000 to 10,000, a hydroxyl value in the range of 30 to 200 mgKOH/g, preferably 50 to 180 mgKOH/g, and an acid value in the range of 5 to 100 mgKOH/g, preferably 10 to 60 mgKOH/g.

Crosslinking Agent (B):

The crosslinking agent (B) in the present invention may include a blocked polyisocyanate curing agent ($b_1$), a water-dispersible blocked polyisocyanate curing agent ($b_2$), a melamine resin ($b_3$) and the like.

The blocked polyisocyanate curing agent (b) used as the crosslinking agent component is a blocked polyisocyanate curing agent obtained by blocking an isocyanate group of a polyisocyanate having at least two free isocyanate groups in one molecule with a blocking agent.

The polyisocyanate in the blocked polyisocyanate curing agent ($b_1$) may include, for example, aliphatic polyisocyanates such as hexamethylene diisocyanate, trimethylhexamethylene diisocyanate, dimer acid diisocyanate, lysine diisocyanate, and the like; biuret type adducts of the above polyisocyanate, isocyanuric type adducts, and the like; alicyclic diisocyanates such as isophorone diisocyanate, 4,4-methylenebis(cyclohexylisocyanate), methylcyclohexane-2, 4-(or -2,6-) diisocyanate, 1,3-(or 1,4-) di(isocyanatomethyl) cyclohexane, 1,4-cyclohexane diisocyanate, 1,3-cyclopentane diisocyanate, 1,2-cyclohexane diisocyanate and the like; biuret type adducts of the above polyisocyanate, isocyanuric ring type adducts; aromatic diisocyanate compounds such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenyl ether diisocyanate, (m- or p-) phenylene diisocyanate, 4,4'-biphenylene diisocyanate, 3,3'-dimethyl-4,4'-biphenylene diisocyanate, bis(4-isocyanatophenyl)sulfone, isopropylidenebis(4-phenylisocyanate) and the like; biuret type adducts of the above polyisocyanates, isocyanuric type ring adducts; polyisocyanates having at least three isocyanate groups in one molecule, for example, triphenylmethane-4,4'-triisocyanate, 1,3, 5-triisocyanatobenzene, 2,4,6-triisocyanatotoluene, 4,4'-dimethyldiphenylmethane-2,2',5,5'-tetraisocyanate and the like; biuret type adducts of the above polyisocyanates, isocyanuric type ring adducts; urethanized adducts obtained by reacting a polyisocyanate compound with a polyol such as ethylene glycol, propylene glycol, 1,4-butylene glycol, dimethylolpropionic acid, polyalkylene glycol, trimethylolpropane, hexanetriol and the like in an excess amount of isocyanate group to hydroxyl group of the polyol; biuret type adducts of the above polyisocyanates, isocyanuric type ring adducts; and the like.

Heating of the blocking agent used to block a free isocyanate group at 100° C. or higher, preferably 130° C. or higher makes it possible to easily react with hydroxyl group. Examples of the blocking agent may include, for example, phenols such as phenol, cresol, xylenol, nitrophenol, ethylphenol, hydroxydiphenyl, butylphenol, isopropylphenol, nonylphenol, octylphenol, methyl hydroxybenzoate, and the like; lactams such as ε-caprolactam, δ-valerolactam, γ-butylolactam, β-propiolactam, and the like; aliphatic alcohols such as methanol, ethanol, propyl alcohol, butyl alcohol, amyl alcohol, lauryl alcohol and the like; ethers such as ethylene glycol monomethyl ether; ethylene glycol monoethyl ether, ethylene glycol monobutyl ether, diethylene glycol monomethyl ether, diethylene glycol monoethyl ether, propylene glycol monomethyl ether, methoxymethanol and the like; benzyl alcohol; glycolic acid; glycolates such as methyl glycolate, ethyl glycolate, butyl glycolate and the like; lactic acid, lactates such as methyl lactate, ethyl lactate, butyl lactate and the like; alcohols such as methylol urea, methylol melamine, diacetone alcohol, 2-hydroxyethyl acrylate, 2-hydroxyethyl methacrylate and the like; oximes such as formamideoxime, acetamideoxime, acetoxime, methylethylketooxime, diacetylmonooxime, benzophenoneoxime, cyclohexaneoxime and the like; active methylens such as dimethyl malonate, diethyl malonate, ethyl acetoacetate, methyl acetoacetate, acetylacetone and the like; mercaptans such as butylmercaptan, t-butylmercaptan, hexylmercaptan, t-dodecylmercaptan, 2-mercaptobenzothiazole, thiophenol, methylthiophenyl, ethylthiophenyl and the like;

acid amides such as acetanilide, acetanisizide, acettoluide, acrylamide, methacrylamide, acetic acid amide, stearic acid amide, benzamide and the like; imides such as succinic acid imide, phthalic acid imide, maleic acid imide and the like; amines such as diphenylamine, phenylnaphthylamine, xylidine, N-phenylxylidine, carbazole, aniline, naphthylamine, butylamine, dibutylamine, butylphenylamine and the like; imidazoles such as imidazole, 2-ethylimidazole and the like; pyrazoles such as 3,5-dimethylpyrazole and the like; ureas such as urea, thiourea, ethyleneurea, ethylenethiourea, diphenylurea and the like; carbamates such as phenyl N-phenylcarbamate and the like; imines such as ethyleneimine, propyleneimine and the like; sulfites such as sodium bisulfite, potassium bisulfite; and the like.

The water-dispersible blocked polyisocyanate curing agent ($b_2$) may be prepared by making the blocked polyisocyanate curing agent ($b_1$) water-dispersible for the purpose of making the low VOC content possible in the crosslinking agent (B) within such a range that the coating film performances may not be reduced.

The water-dispersible blocked polyisocyanate curing agent ($b_2$) is a water-dispersible blocked polyisocyanate prepared by blocking an isocyanate group of a polyisocyanate with a blocking agent and hydroxymonocarboxylic acids, followed by neutralizing the carboxyl group of the hydroxymonocarboxylic acids to impart water-dispersibility.

The polyisocyanate may include the polyisocyanate as exemplified in the blocked polyisocyanate curing agent ($b_1$), and preferably may include hexamethylene diisocyanate (HMDI), derivatives of hexamethylene diisocyanate (HMDI), isophorone diisocyanate (IPDI), and derivatives of isophorone diisocyanate.

In the preparation of the water-dispersible blocked polyisocyanate curing agent ($b_2$), the isocyanate group of the polyisocyanate is blocked with the blocking agent, and reacted with the hydroxymonocarboxylic acids, so that addition of at least one isocyanate group of the polyisocyanate to the hydroxyl group of the hydroxymonocarboxylic acids may take place.

The blocking agent may include the blocking agent as exemplified in the blocked polyisocyanate curing agent ($b_1$). The hydroxymonocarboxylic acids may include 2-hydroxyacetic acid, 2-hydroxypropanoic acid, 1,2-hydroxy-9-octadecanoic acid (ricinoleic acid), 3-hydroxy-2,2-dimethylpropanoic acid (hydroxypivalic acid), dimethylolpropionic acid (DMPA) and the like. Of these, 3-hydroxy-2,2-dimethylpropanoic acid (hydroxypivalic acid) is preferable. The solvent used in the reaction may include ones non-reactive with isocyanate group, and, for example, ketones such as acetone, methyl ethyl ketone and the like, esters such as ethylacetate and the like, and N-methylpyrrolidone.

A melamine resin ($b_3$) may be used as a curing agent in combination with the above curing agents. The melamine resin ($b_3$) may include a methylol amino resin obtained by reacting melamine with an aldehyde. The aldehyde may include formaldehyde, paraformaldehyde, acetaldehyde, benzaldehyde and the like. The above melamine resin may also include ones obtained by etherifying a part or all of the methylol group in the methylol amino resin with a monoalcohol. The monoalcohol used in etherification may include methyl alcohol, ethyl alcohol, n-propyl alcohol, i-propyl alcohol, n-butyl alcohol, i-butyl alcohol, 2-ethyl butanol, 2-ethyl hexanol and the like.

The melamine may preferably include such a melamine that at least three methylol groups on an average per one triazine nucleus are methyl etherified, and a hydrophilic melamine which is such a melamine resin that a part of the methoxy group obtained as above is substituted with a monoalcohol having 2 or more carbon atoms, and which further has an imino group, an average degree of condensation of about 2 or less, and about 50% by weight of a melamine having one triazine nucleus.

A mixing ratio of the polyester resin (A) to the crosslinking agent (B) in the water based intercoat coating composition of the present invention is such that the polyester resin (A) is in the range of 20 to 80% by weight, particularly 40 to 70% by weight, and the crosslinking agent (B) is in the range of 80 to 20% by weight, particularly 60 to 30% by weight.

Formulation may preferably be carried out by mixing at least two of the blocked polyisocyanate curing agent ($b_1$), the water-dispersible blocked polyisocyanate curing agent ($b_2$), and the melamine resin ($b_3$), followed by adding the polyester resin (A), because an inclusion of the curing agent ($b_1$) free of a water-dispersible group into the water-dispersible curing agent ($b_2$) may improve water-dispersibility and compatibility with the polyester resin (A), resulting in that dilution with water after neutralization may make it possible to obtain an optimum viscosity for coating at a solid content higher than in the art.

Water Based Urethane Resin Emulsion (C):

The water based urethane resin emulsion (C) may include ones prepared by reacting an active hydrogen-containing compound ($c_1$), a compound ($c_2$) having an active hydrogen group and a hydrophilic group in the molecule and an organic polyisocyanate ($c_3$) to obtain a resin, followed by dispersing or dissolving the resin into water.

The active hydrogen-containing compound ($c_1$) may include, for example, a macromolecular polyol, a low-molecular polyol, a polyamine and the like (see Japanese Patent Application Laid-Open No. 9951/91, for example).

The macromolecular polyol may preferably include polyether polyol, polyester polyol and polycarbonate polyol. The macromolecular polyol may have a hydroxy equivalent usually in the range of 200 to 3000, preferably 250 to 2000. The low-molecular polyol may preferably include 1,4-butanediol, 3-methylpentanediol, pentaerythritol and trimethylolpropane. The polyamine may preferably include hexamethylenediamine, isophorone diamine, N-hydroxyethylethylenediamine and 4,4'-diaminodicyclohexylmethane.

The compound ($c_2$) having active hydrogen and hydrophilic group in the molecule may include compounds containing active hydrogen and anionic group or anion-forming group, for example, dihydroxycarboxylic acid such as α,α'-dimethylolpropionic acid, α,α'-dimethylolbutyric acid and the like, dihydroxysulfonate such as sodium 3-(2,3-dihydroxypropoxy)-1-propanesulfonate and the like, diaminocarboxylic acid such as diaminobenzoic acid, and the like. A base to neutralize the above compounds may include an organic base such as triethylamine, trimethylamine and the like, and an inorganic base such as sodium hydroxide, potassium hydroxide and the like, and the like.

Additionally, compounds having active hydrogen and cationic group including cation-forming group may include, for example, N-methyldiethanolamine, N-butyldiethanolamine and bis(3-aminopropyl)methylamine. A compound to make a quaternary group the cation-forming group may include methyl chloride, dimethylsulfate, benzyl chloride and the like. An acid to neutralize the resulting compounds may include formic acid, acetic acid, lactic acid, phosphoric acid and the like.

The organic polyisocyanate ($c_3$) may include isophorone diisocyanate (IPDI), hexamethylene diisocyanate (HDI), 4,4'-dicyclohexylmethane diisocyanate (hydrogenated MDI), 2,4 and/or 2,6-tolylene diisocyanate (TDI), 4,4'-diphenylmethane diisocyanate (MDI), $\alpha,\alpha,\alpha',\alpha'$-tetramethylxylylene diisocyanate (TMXDI) and the like.

The preparation of the urethane resin may be carried out by one shot method which comprises reacting the active hydrogen-containing compound including the compound having active hydrogen and hydrophilic group in the molecule and the organic polyisocyanate simultaneously, or by a multi-stage method which comprises reacting a part of the active hydrogen-containing compound, for example, the macromolecular polyol and the organic polyisocyanate to form an isocyanate group-terminating prepolymer, followed by reacting the remainder of the active hydrogen-containing compound.

An urethane resin-synthesizing reaction may be carried out at 40 to 1400° C., preferably 60 to 120° C. The reaction may be carried out in an organic solvent inactive with the isocyanate, for example, acetone, toluene, dimethylformamide and the like. Otherwise, the organic solvent may be added during the reaction or after the completion of the reaction.

The water based urethane resin emulsion (C) may be prepared by neutralizing the urethane resin having the hydrophilic group and the anion-forming group with a base to form an anionic group, or by treating the urethane resin having the hydrophilic group and the cation-forming group with a quaternary group-forming agent or neutralizing with an acid to form a cationic group, followed by dispersing or dissolving into water.

On dispersing or dissolving the urethane resin into water to form an emulsion, optionally, an anionic and/or nonionic surface active agent may be added in the case of an anionic urethane resin, or a cationic and/or nonionic surface active agent may be added in the case of a cationic urethane resin.

A mixed amount of the water based urethane resin emulsion (C) is in the range of 0.1 to 100 parts by weight, preferably 1 to 50 parts by weight, more preferably 5 to 20 parts by weight per 100 parts by weight of a total solid content of the polyester resin (A) and the crosslinking agent (B). When less than 0.1 part by weight, anti-chipping properties may not be improved, and when more than 100 parts by weight, coating composition properties may become poor.

Flat-Shaped Pigment Particle (D):

The flat-shaped pigment particle (D) is a scaly, thin, flat-shaped pigment, and may include, for example, talc, aluminum flake, mica flake and the like. Of these, the talc is preferable. The talc has a shape having a thickness in the range of 0.1 to 2 µm, particularly 0.1 to 1.5 µm, and a longitudinal length in the range of 1 to 100 µm, particularly 2 to 20 µm.

The talc may include ones used as an extender pigment in the coating composition, and may form a layer along with other various pigments so as to be piled up within a coating film when formed, resulting in providing a function to relax an internal stress and an external stress.

A mixed amount of the flat-shaped pigment particle (D) is in the range of 0.1 to 50 parts by weight, preferably 1 to 20 parts by weight, more preferably 5 to 15 parts by weight.

An amount of the flat-shaped pigment particle (D) less than 0.1 part by weight may not provide any improvements in anti-chipping properties. When more than 50 parts by weight, anti-chipping properties may be reduced, and coating composition stability may become poor.

The water based intercoat coating composition of the present invention may optionally contain an acrylic resin, urethane resin, solid color pigment, metallic pigment, light-coherent pigment, extender pigment, dispersant, anti-settling agent, organic solvent, urethane-forming reaction-promoting catalyst such as an organotin compound, hydroxy group-melamine resin crosslinking reaction-promoting catalyst such as an acid catalyst, anti-foaming agent, thickening agent, anti-corrosive agent, ultraviolet light absorbent, surface controlling agent and the like.

A curing catalyst may be added for the purpose of promoting a crosslinking reaction of the coating film. The curing catalyst may include an organometallic compound such as tin octylate, dibutyltin(2-ethylhexanoate), dioctyltin-di(2-ethylhexanoate), dioctyltindiacetate, dibutyltindilaurate, dibutyltinoxide, monobutyltintrioctate, lead 2-ethylhexanoate, zinc octylate and the like.

A mixing amount of the curing catalyst may be arbitrarily selected, but is in the range of 0.01 to 5 parts by weight, particularly 0.05 to 3 parts by weight per 100 parts by weight of a total solid content of the polyester resin (A) and the crosslinking agent (B).

Coating may be carried out by the known coating methods, for example, spray coating, air spray coating, airless spray coating, electrostatic coating and the like, so as to form a coating film having a thickness in the range of 10 to 100 µm, particularly 20 to 60 µm as a cured coating film. The resulting coating film may be heated at 120 to 170° C., particularly 130 to 160° C. for 10 to 40 minutes so as to be crosslinked and cured.

The coating film formed by use of the water based intercoat coating composition shows excellent anti-chipping properties, and may preferably be used as a water based intercoat coating composition for use in a multi-layer coating film formed onto an automobile body or the like by forming a primer coating film, an intercoat coating film, curing or not curing, and by coating a topcoat coating composition.

The water based intercoat coating composition of the present invention can obtain an optimum viscosity (for example, Ford Cup No. 4, 20° C., 50 seconds) for coating at a higher solid content (%) compared with those in the art, resulting in making possible a low VOC.

At least one topcoat coating composition selected from a solid color coating composition, metallic coating composition, light-coherent coating composition, clear coating composition and the like may be coated so as to form a monolayer or multi-layer topcoating film.

A multi-layer coating film-forming method by use of the water based intercoat coating composition of the present invention is explained more in detail hereinafter.

Coating Film-Forming Method:

The multi-layer coating film-forming method comprises coating a primer coating composition such as a cationic electrodeposition coating composition, followed by coating a water based intercoat coating composition, and coating a colored base coating composition or a clear coating composition to form monolayer or multi-layer colored base coating film or monolayer or multi-layer clear coating film, and may specifically include the following methods (a) to (c).

The method (a) may include a one coat·one bake (1C1B) method which comprises coating a primer coating composition such as a cationic electrodeposition coating composition and the like onto a metal or plastic substrate as in the automobile, followed by coating the water based intercoat coating composition of the present invention, curing, and coating a solid color topcoating composition by a coating method such as airless spray coating, air spray coating, rotary spray coating and the like so as to be a coating film thickness in the range of about 10 to 50 μm, and heat curing at about 100 to 180° C. for about 10 to 90 minutes.

The method (b) may include a two coats·one bake (2C1B) coating method and a two coats·two bakes (2C2B) coating method which comprise coating a primer coating composition such as a cationic electrodeposition coating composition and the like onto a metal or plastic substrate, followed by coating the water based intercoat coating composition of the present invention, curing, coating a colored coating composition by a coating method such as an airless spray coating, air spray coating, rotary spray coating and the like so as to be a coating film thickness in the range of about 10 to 50 μm, heat curing at about 100 to 180° C. for about 10 to 40 minutes, or leaving to stand at room temperature for several minutes or preheating without curing, coating a clear coating composition so as to be a cured coating film thickness in the range of about 10 to 70 μm, and heat curing at about 60 to 160° C. for about 10 to 90 minutes.

The method (c) uses the same colored coating composition as that used in the method (a) and a transparent coating film-forming coating composition as a first clear coating composition, i.e. such a coating composition that almost all of the pigment is removed from the colored coating composition, and includes a three coats·one bake (3C1B) method, three coats·two bakes (3C2B) method and three coats·three bakes (3C3B) method, which comprise coating a colored coating composition, followed by coating a first clear coating composition so as to be a cured coating film thickness in the range of about 10 to 50 μm, heat curing at about 60 to 160° C. for about 10 to 90 minutes, or leaving to stand at room temperature for several minutes or preheating without curing, and coating a second clear coating composition so as to be a cured coating film thickness in the range of about 10 to 70 μm, and heat curing at about 60 to 180° C. for about 10 to 90 minutes.

The present invention provides the following particular effects.

According to the present invention, the use of the water based intercoat coating composition containing the polyester resin (A) comprising, as essential components, an alicyclic polybasic acid ($a_1$) and/or an alicyclic polyhydric alcohol ($a_2$), other polybasic acid ($a_3$) and other polyhydric alcohol ($a_4$), (B) a crosslinking agent, (C) a water based urethane resin emulsion, and preferably a flat-shaped pigment particle (D) such as talc makes it possible to provide a water based intercoat coating composition having high solid content, low volatile organic compound content and excellent coating composition stability, and provide a multi-layer coating film showing excellent properties in anti-chipping properties, finished appearance and water resistance.

Additionally, a remarkably improved balance between hydrophilic properties and hydrophobic properties due to a combined use of respective curing agents can improve compatibility thereof with the polyester resin (A) and makes possible an optimum viscosity for coating at a high solid content, resulting in making it possible to reduce a volatile organic solvent content in the coating composition.

EXAMPLE

The present invention is explained more in detail by the following Examples, in which "part" and "%" represent "part by weight" and "% by weight" respectively. The present invention is not limited to the Examples.

Preparation Example 1

Preparation Example of Polyester Resin No. 1

A four-necked flask equipped with a heater, stirrer, thermometer, reflux condenser and a water separator was charged with 61.9 parts of 1,3-cyclohexane dicarboxylic acid, 70.1 parts of adipic acid, 62.8 parts of trimethylolpropane, 24.2 parts of neopentyl glycol and 44.6 parts of 1,4-cyclohexane dimethanol, followed by heating the content up from 160° C. to 230° C. over 3 hours, keeping at 230° C. for one hour, distilling off a resulting condensation water by use of a fractionating column, adding 15.0 parts of anhydrous trimellitic acid to the resulting product, desolvating, neutralizing with dimethylethanolamine, and mixing with water to obtain polyester resin No. 1 having a solid content of 40%, hydroxyl value of 150 mgKOH/g, acid value of 35 mgKOH/g and a number average molecular weight of 2,000. A mixing amount represented by part by weight is shown in Table 1.

Preparation Example 2

Preparation Example of Polyester Resin No. 2

A four-necked flask equipped with a heater, stirrer, thermometer, reflux condenser and a water separator was charged with 43.8 parts of adipic acid, 77.0 parts of isophthalic acid, 54.6 parts of trimethylolpropane, 64.0 parts of butylethylpropanediol and 21.0 parts of neopentyl glycol, followed by reacting, adding 15.3 parts of anhydrous trimellitic acid to the reaction product, desolvating, neutralizing with dimethylethanolamine, and mixing with water to obtain polyester resin No. 2 having a solid content of 40%, hydroxyl value of 140 mgKOH/g, acid value of 35 mgKOH/g and a number average molecular weight of 2,000. A mixing amount represented by part by weight is shown in Table 1.

TABLE 1

| Polyester resin | No. 1 | No. 2 |
|---|---|---|
| 1,3-cyclohexanedicarboxylic acid | 61.9 | — |
| Adipic acid | 70.1 | 43.8 |
| Isophthalic acid | — | 77.0 |
| Trimethylolpropane | 62.8 | 54.6 |
| Butylethylpropanediol | — | 64.0 |
| Neopentyl glycol | 24.2 | 21.0 |
| 1,4-cyclohexanedimethanol | 44.6 | — |
| Anhydrous trimellitic acid | 15.0 | 15.3 |

Preparation of Crosslinking Agent (B)

Preparation Example 3

(Preparation Example of Blocked Polyisocyanate Curing Agent ($b_1$))

At 40 to 60° C., 50 parts of hexamethylene diisocyanate was dropped into 40 parts of methylketoxime, followed by heating at 80° C. for one hour to obtain a 90% solid content curing agent No. 1 having a NCO content of 16.5% by weight.

Preparation of Water Based Urethane Resin Emulsion (C)

Preparation Example 4

An autoclave equipped with a thermometer and a stirrer was charged with a mixture of 173.9 parts of polyethylene-adipatediol (number average molecular weight 2000), 6.6 parts of trimethylolpropane, 47.6 parts of dimethylolpropionic acid, 171.9 parts of IPDI and 400.0 parts of acetone, followed by introducing nitrogen gas, reacting at 80° C. for 7 hours with agitation to obtain an acetone solution of an isocyanate (NCO) terminating urethane prepolymer having a NCO content of 2.65%, cooling the acetone solution at 30° C., adding 35.9 parts of triethylamine, adding a solution prepared by dissolving 20.0 parts of diethanolamine into 780 parts of water, and distilling off acetone at 50 to 60° C. under vacuum to obtain a 40.0% solid content water based urethane resin emulsion C-1.

Preparation Example 5

An autoclave was charged with a mixture of 246.7 parts of polycaprolactonediol (number average molecular weight 2000), 7.4 parts of 1,4-butanediol, 5.1 parts of trimethylolpropane, 17.9 parts of dimethylolpropionic acid, 123.0 parts of IPDI and 400 parts of acetone, followed by introducing nitrogen gas so as to be replaced, reacting at 80° C. for 7 hours to obtain an acetone solution of an isocyanate (NCO)-terminating urethane prepolymer having a NCO content of 1.67%, cooling the acetone solution at 30° C., adding 13.5 parts of triethylamine, adding 600 parts of water, distilling off the acetone at 50 to 60° C. under vacuum to obtain a 40.0% solid content water based urethane resin emulsion C-2.

Example 1

A mixture of 35.6 parts (solid content 32.0 parts) of curing agent No. 1 obtained in Preparation Example 4 and 40.0 parts (solid content 16.0 parts) of Desmodur TP LS2310 (trade name, marketed by Sumika Bayel Urethane Co. Ltd.) (Note 1) was prepared, followed by adding 130 parts solid content 52 parts) of the polyester resin No. 1 obtained in Preparation Example 1, 25 parts (solid content 10 parts) of the water based urethane resin emulsion C-1 obtained in Preparation Example 5, 10 parts of Micro Ace S-3 (Note 5), 64 parts of JR-806 (Note 6), 0.6 parts of Carbon MA-100 (Note 7) and 30 parts of Barium Sulfate B35 (Note 8), dispersing and mixing, adding deionized water and controlling a viscosity at 50 seconds by Ford-Cup No. 4 to obtain a water based intercoat coating composition No. 1. Mixing amounts represented by part by weight are shown in Table 2.

Examples 2–6, Comparative Examples 1–3

Respective water based intercoat coating compositions No. 2 to No. 9 of Examples 2–6 and Comparative Examples 1–3 were prepared according to the formulations shown in Table 2. Mixing amounts represented by part by weight are shown in Table 2.

TABLE 2

| | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Water based intercoat coating composition | No. 1 | No. 2 | No. 3 | No. 4 | No. 5 | No. 6 | No. 7 | No. 8 | No. 9 |
| Polyester resin No. 1 | 130.0 | 130.0 | 130.0 | 130.0 | 130.0 | 130.0 | 130.0 | | 130.0 |
| (solid content 40%) | (52.0) | (52.0) | (52.0) | (52.0) | (52.0) | (52.0) | (52.0) | | (52.0) |
| Polyester resin No. 2 | | | | | | | | 130.0 | |
| (solid content 40%) | | | | | | | | (52.0) | |
| Curing agent No. 1 | 53.3 | 53.3 | 53.3 | 26.7 | | 26.7 | 53.3 | 53.3 | 53.3 |
| (solid content 90%) | (48.0) | (48.0) | (48.0) | (24.0) | | (24.0) | (48.0) | (48.0) | (48.0) |
| Desmodur TP LS2310 (Note 1) | | | | 120.0 | 120.0 | | | | |
| (solid content 40%) | | | | (24.0) | (48.0) | | | | |
| Cymel 325 (Note 2) | | | | | | 30.0 | | | |
| (solid content 80%) | | | | | | (24.0) | | | |
| Water based urethane resin emulsion C-1 | 25 | | | 25 | 25 | 25 | | 25 | |
| (solid content 40%) | (10) | | | (10) | (10) | (10) | | (10) | |
| Water based urethane resin emulsion C-2 | | 25 | | | | | | | |
| (solid content 40%) | | (10) | | | | | | | |
| U coat UX-8100 (Note 3) | | | 27 | | | | | | |
| (solid content 37%) | | | (10) | | | | | | |
| Staphyloid AC4030 (Note 4) | | | | | | | | | 25 |
| (solid content 40%) | | | | | | | | | (10) |
| Micro Ace S-3 (Note 5) | 10 | 10 | 10 | 10 | 10 | 10 | 10 | 10 | 10 |
| JR-806 (Note 6) | 64 | 64 | 64 | 64 | 64 | 64 | 64 | 64 | 64 |
| Carbon MA-100 (Note 7) | 0.6 | 0.6 | 0.6 | 0.6 | 0.6 | 0.6 | 0.6 | 0.6 | 0.6 |
| Barium Sulfate B35 (Note 8) | 30 | 30 | 30 | 30 | 30 | 30 | 30 | 30 | 30 |

(Note 1) Desmodur TP LS2310: Trade name, marketed by Sumika Bayel Urethane Co., Ltd., water-dispersible blocked polyisocyanate, solid content 40%.

(Note 2) Cymel 325: Trade name, marketed by Mitsui Cytec Ltd., methyl-butylated melamine resin, solid content 80%.

(Note 3) U coat UX-8100: Trade name, marketed by Sanyo Chemical Industries, Ltd., water based urethane resin emulsion, solid content 37%.

(Note 4) Staphyloid AC4030: Trade name, marketed by Takeda Chemical Industries, Ltd., core-shell type emulsion, solid content 40%.

(Note 5) Micro Ace S-3: Trade name, marketed by Nippon Talc Co., Ltd., talc.

(Note 6) JR-806: Trade name, marketed by Tayka Corporation, titanium white.
(Note 7) Carbon MA-100: Trade name, marketed by Mitsubishi Chemical Corporation, carbon black.
(Note 8) Barium Sulfate B35: Trade name, marketed by Sakai Chemical Industry Co., Ltd., extender pigment.

Preparation of Test Panel for Coating Film Performance Test

Elecron GT-10 (trade name, marketed by Kansai Paint Co., Ltd., cationic electrodeposition coating composition) was coated onto a cold rolled steel sheet treated with Palbond #3020 (trade name, marketed by Nippon Parkerizing Co., Ltd., zinc phosphate treatment) to form a coating film having a dry film thickness of 20 μm, followed by coating water based intercoat coating composition No. 1 to No. 9 (Table 2) as prepared in Examples and Comparative Examples to be a thin film of 15 μm and a thick film of 35 μm respectively, heat curing at 140° C. for 20 minutes, coating Magicron TB-515 (Trade name, marketed by Kansai Paint Co., Ltd., acrylic·melamine resin based coating composition) to a film thickness of 15 μm, leaving to stand at room temperature for 3 minutes, coating a clear coating composition Magicron TC-71 (Trade name, marketed by Kansai Paint Co., Ltd., acrylic-melamine resin based coating composition) to a film thickness of 35 μm, and heat curing both coating films at 140° C. for 30 minutes simultaneously to obtain multi-layer coating films respectively.

Test Results

Performance test results of the above multi-layer coating films are shown in Table 3, in which mixing amounts of respective components are represented by weight of the solid content respectively.

⊚: Size of the mar is small and the intercoat coating film is exposed,
○: Size of the mar is small, and the intercoat coating film and a part of the electrodeposition coating film are exposed,
Δ: size of the mar is small, but the electrodeposition coating film and the steel sheet substrate are exposed,
X: size of the mar is considerably large, and the steel sheet substrate is largely exposed.

(Note 10) VOC: A coating composition solid content at a viscosity of 50 seconds, Ford-cup No. 4, 20° C. as measured under the conditions of drying at 110° C. for one hour, a specific gravity of coating composition according to a specific gravity cup method in accordance with JIS K-5400 4.6.2, and a moisture amount according to an automatic moisture measuring apparatus KF-100, trade name, marketed by Mitsubishi Chemical Corporation were measured respectively, followed by calculating a VOC amount excepting water in the coating composition according to the following formula (1):

$$VOC(g/L) = 1000 \times \text{specific gravity}^* \times [(100 - \text{coating composition solid content})/100] \quad (1)$$

specific gravity*: specific gravity of a coating composition when water removed.

(Note 11) Water resistance: A test panel was dipped into a hot water at 40° C. for 240 hours, followed by cutting the coating film on the test panel having the 35 μm thick water based intercoat coating film so as to reach a substrate and to form 100 squares of 2 mm×2 mm, followed by adhering thereonto an adhesive cellophane tape, strongly sepa-

TABLE 3(1)

|  |  | Example 1 | Example 2 | Example 3 | Example 4 | Example 5 | Example 6 |
|---|---|---|---|---|---|---|---|
| Anti-chipping properties (Note 9) (gravels No. 7–50 g) | thin film (15 μm) | ○ | ○ | ○ | ○ | ○ | ○ |
|  | thick film (35 μm) | ⊚ | ⊚ | ⊚ | ⊚ | ⊚ | ⊚ |
| VOC (Note 10) g/L |  | 120 | 120 | 120 | 90 | 100 | 120 |
| Water resistance (Note 11) |  | ○ | ○ | ○ | ○ | ○ | ○ |
| Smoothness in appearance (Note 12) |  | ○ | ○ | ○ | ○ | ○ | ○ |
| Coating composition stability (Note 13) |  | ○ | ○ | ○ | ○ | ○ | ○ |

TABLE 3(2)

|  |  | Comparative Example 1 | Comparative Example 2 | Comparative Example 3 |
|---|---|---|---|---|
| Anti-chipping properties (Note 9) (gravels No. 7–50 g) | thin film (15 μm) | X | Δ | Δ |
|  | thick film (35 μm) | Δ | Δ | Δ |
| VOC (Note 10) g/L |  | 150 | 150 | 120 |
| Water resistance (Note 11) |  | ○ | Δ | ○ |
| Smoothness in appearance (Note 12) |  | ○ | Δ | ○ |
| Coating composition stability (Note 13) |  | X | ○ | Δ |

(Note 9) Anti-chipping properties: A test panel was mounted on a test panel holder of a Q-G-R Gravelometer (trade name, marketed by Q Panel Co., Ltd., USA, chipping test apparatus), followed by spraying 50 g of granite gravels having a particle size of No. 7 onto the surface of a coating film under an air pressure of 0.392 MPa (4 kgf/cm²) at −20° C., and visually evaluating degree of development of mars on the coating film as follows.

rating the tape at 20° C., and examining a number of remaining squares. Evaluation was carried out as follows.
○: 100 squares remain,
Δ: 99 to 95 squares remain,
X: 94 or less of squares remain.

(Note 12) Smoothness in appearance: Appearance of the test panel obtained as above and having the 35 μm thick water based intercoat coating film visually evaluated as follows.

○: Showing good smoothness in appearance, high gloss and clean definition properties,
Δ: Showing poor properties in smoothness in appearance, gloss or definition properties,
X: Showing seriously poor properties in smoothness in appearance, gloss or definition properties.
(Note 13) Coating composition stability: A coating composition was stored at 40° C. for 10 days, followed by examining the conditions of the coating composition. Evaluation was carried out as follows.
○: No problems,
Δ: Some phase separation developed, some increase in viscosity,
X: Remarkable phase separation developed, remarkable increase in viscosity.

What is claimed is:

1. A water based intercoat coating composition consisting of (A) a polyester resin consisting of, as essential components, an alicyclic polybasic acid ($a_1$), an alicyclic polyhydric alcohol ($a_2$), other polybasic acid ($a_3$) and other polyhydric alcohol (a4), (B) a crosslinking agent selected from the group consisting of a blocked polyisocyanate curing agent ($b_1$), a water-dispersible blocked polyisocyanate curing agent ($b_2$) and a melamine resin ($b_3$), (C) a water based urethane resin emulsion obtained by reacting an active hydrogen-containing compound ($c_1$), a compound ($c_2$) having an active hydrogen group and a hydrophilic group in the molecule and an organic polyisocyanate ($c_3$) to obtain a resin, followed by dispersing or dissolving the resin into water, and a flat-shaped pigment particle (D) consisting of talc, a content of the alicyclic polybasic acid ($a_1$) and the alicyclic polyhydric alcohol ($a_2$) in the polyester resin (A) being in the range of 30 to 60 percent by weight based on a total solid content of the alicyclic polybasic acid ($a_1$), the alicyclic polyhydric alcohol ($a_2$), other polybasic acid ($a_3$) and other polyhydric alcohol ($a_4$), the alicyclic polybasic acid ($a_1$) being 1,3-cyclohexane dicarboxylic acid or 1,4-cyclohexane dicarboxylic acid, the alicyclic polyhydric alcohol ($a_2$) being 1,4-cyclohexane dimethanol, the water based urethane resin emulsion (C) being in the range of 5 to 20 parts by weight per 100 parts by weight of a total solid content of the polyester resin (A) and the crosslinking agent (B), and the flat-shaped talc particle being in the range of 1 to 20 parts by weight per 100 parts by weight of a total solid content of the polyester resin (A) and the crosslinking agent (B).

2. A multi-layer coating film-forming method which comprises successively coating a cationic electrodeposition coating composition onto a substrate, coating a water based intercoat coating composition as claimed in claim 1, curing or not curing, coating a topcoat coating composition to form at least one topcoat coating film layer, and heating at 120 to 170° C. for 10 to 40 minutes to be crosslinked and cured.

* * * * *